United States Patent
Ellis et al.

(10) Patent No.: US 11,658,909 B2
(45) Date of Patent: May 23, 2023

(54) ANALYZING NETWORK TRAFFIC BY ENRICHING INBOUND NETWORK FLOWS WITH EXIT DATA

(71) Applicant: Kentik Technologies, Inc., San Francisco, CA (US)

(72) Inventors: Daniel P. Ellis, Milbrae, CA (US); Ian Gerald Pye, San Francisco, CA (US); Gregoire Villain, San Francisco, CA (US); Dhammika Pathirana, Berkeley, CA (US)

(73) Assignee: Kentik Technologies, Inc., San Francisco, CA (US)

( * ) Notice: Subject to any disclaimer, the term of this patent is extended or adjusted under 35 U.S.C. 154(b) by 279 days.

(21) Appl. No.: 16/378,386

(22) Filed: Apr. 8, 2019

(65) Prior Publication Data

US 2019/0312813 A1 Oct. 10, 2019

Related U.S. Application Data

(60) Provisional application No. 62/655,754, filed on Apr. 10, 2018.

(51) Int. Cl.
| | | |
|---|---|---|
| *H04L 47/17* | (2022.01) | |
| *H04L 43/08* | (2022.01) | |
| *H04L 45/00* | (2022.01) | |
| *H04L 61/5007* | (2022.01) | |
| *H04L 43/04* | (2022.01) | |
| *H04L 43/12* | (2022.01) | |
| *H04L 45/745* | (2022.01) | |
| *H04L 43/065* | (2022.01) | |

(52) U.S. Cl.
CPC .............. *H04L 47/17* (2013.01); *H04L 43/08* (2013.01); *H04L 45/20* (2013.01); *H04L 61/5007* (2022.05)

(58) Field of Classification Search
None
See application file for complete search history.

(56) References Cited

U.S. PATENT DOCUMENTS 5,996,021 A * 11/1999 Civanlar .............. H04L 12/4608
370/392
7,889,666 B1 * 2/2011 Pei ........................ H04L 41/065
370/242

(Continued)

*Primary Examiner* — Jeffrey M Rutkowski
*Assistant Examiner* — Ning Li
(74) *Attorney, Agent, or Firm* — Fenwick & West LLP

(57) ABSTRACT

A network monitoring engine uses the routing and interface data of a monitored network to enrich received flow records with exit information. The routing data of the same network device at which the flow record is received is used to determine a next hop based upon the destination IP address of the flow record. In addition, interface data of the other devices is used to determine an egress device and interface of the network used to transmit traffic to the identified next hop. The flow record is enriched with exit information indicating an interface of the network the data packets of the flow record are expected to exit the network. By enriching the flow records as they are received, the exit information reflects how traffic is routed through the network at that time, even if the routing or interface information of the network later changes.

21 Claims, 7 Drawing Sheets

(56) References Cited

U.S. PATENT DOCUMENTS

| | | | |
|---|---|---|---|
| 8,085,773 B2* | 12/2011 | Meda | H04L 49/35 |
| | | | 370/392 |
| 9,172,591 B2 | 10/2015 | Eggleston et al. | |
| 9,344,359 B1* | 5/2016 | Tiruveedhula | H04L 45/16 |
| 9,680,757 B2 | 6/2017 | Eggleston et al. | |
| 9,942,253 B2 | 4/2018 | Freedman et al. | |
| 10,623,322 B1* | 4/2020 | Nallamothu | H04L 45/021 |
| 2009/0168648 A1* | 7/2009 | Labovitz | H04L 43/0876 |
| | | | 370/229 |
| 2010/0150005 A1* | 6/2010 | Gerber | H04L 41/12 |
| | | | 370/252 |
| 2011/0142054 A1* | 6/2011 | Scholl | H04L 45/02 |
| | | | 370/395.31 |
| 2013/0282897 A1* | 10/2013 | Siegel | H04L 43/0876 |
| | | | 709/224 |
| 2013/0286846 A1* | 10/2013 | Atlas | H04L 47/726 |
| | | | 370/236 |
| 2015/0131663 A1* | 5/2015 | Brar | H04L 45/745 |
| | | | 370/392 |
| 2015/0304199 A1 | 10/2015 | Leask et al. | |
| 2016/0020964 A1 | 1/2016 | Eggleston et al. | |
| 2017/0317941 A1 | 11/2017 | Eggleston et al. | |
| 2018/0206282 A1* | 7/2018 | Singh | H04W 88/06 |
| 2018/0227212 A1* | 8/2018 | Ferguson | H04L 47/125 |
| 2018/0331963 A1* | 11/2018 | Paul | H04L 47/2483 |
| 2019/0104060 A1* | 4/2019 | Wang | H04L 45/38 |
| 2019/0140937 A1* | 5/2019 | Kumar | H04L 45/02 |
| 2019/0166036 A1* | 5/2019 | Tappin | H04L 41/0806 |

* cited by examiner

ANALYZING NETWORK TRAFFIC BY ENRICHING INBOUND NETWORK FLOWS WITH EXIT DATA

CROSS-REFERENCE TO RELATED APPLICATIONS

This application claims the benefit of U.S. Provisional Application No. 62/655,754 filed Apr. 10, 2018, which is incorporated herein by reference in its entirety.

BACKGROUND

This application relates to computer networks, and more particularly to monitoring and analyzing traffic traversing a computer network.

Internet traffic may pass through multiple discrete networks as it transits paths from its source to its ultimate destination. For example, streaming video traffic destined for a mobile device may originate at a network maintained by a streaming video service provider, pass through one or more intermediate networks, and then ultimately enter a network operated by the mobile device carrier before being routed to the particular mobile device. Similarly, a search query originated by a computer user may pass from a home network operated by the user to the network of the Internet Service Provider (ISP) servicing the user, and from there to one or more intermediate networks before ultimately entering a network operated by entity that will respond to the search query.

In each of these cases, a computer network receives data traffic from a source and routes the traffic to a destination. For an intermediate network, the source is an upstream network and the destination is a downstream network along the path from the traffic's ultimate source to its ultimate destination. Thus, the function of the intermediate network, hereinafter also referred to as a "transit network," is to route the traffic from the upstream network to a particular downstream network that gets the traffic electronically closer to its ultimate destination.

In this context, a transit network has sets of ingress and egress points where the network peers with other networks. The ingress points receive traffic from upstream networks and represent the places where the traffic leaves the upstream networks and enters the transit network. A given network may have multiple ingress points, with each ingress point connected to one or more different upstream networks. The egress points send traffic to downstream networks and represent the places where the traffic exits the transit network and enters the downstream networks. Likewise, a given network may have multiple egress points, with each egress point connected to one or more different downstream networks.

Transporting traffic within a transit network is a complex problem. Generally, the transit network attempts to route the traffic from its ingress point to its egress point in the most efficient manner. "Efficiency" in this case can be measured using a variety of metrics such as including electronic distance, number of nodes of the transit network along the path from the ingress point to the egress point, utilization of particular paths within the transit network, etc. The complexity is compounded for networks that transport large volumes of traffic from multiple upstream networks to multiple downstream networks. Plus, networks are dynamic entities and the most efficient routing at a given point in time might not be efficient, or even valid, at a later point in time.

Network monitoring tools may observe traffic transiting a network in order to help network operators understand how the network is being used. Such tools tend to collect voluminous amounts of data that require large amounts of computational resources to store and analyze. Moreover, the collected data is often opaque and requires time-consuming manual analysis. As a result, it is difficult for a network operator to understand how the network is being used. The efficiencies of the network in transporting data may suffer as a result.

SUMMARY

A network monitoring engine uses the routing information (e.g., BGP routing information) and interface data (e.g., SNMP data) to enrich flow records received from the network devices of a monitored network with exit information. Each flow record received by the network monitoring engine comprises source IP information, and destination IP information. The network monitoring engine enriches the flow record from a device based upon the BGP routing information of that device, by determining the next hop for the flow record based upon the destination IP address. The network monitoring engine also receives-interface data of other network devices on the monitored network, and uses the interface data of the other devices to determine an egress device of the monitored network and an interface of the egress device used by the monitored network to transmit traffic to the next hop identified using the routing data. The determined egress device and interface form the exit information used to enrich the flow records, and indicate how the data packets represented by the flow record are expected to exit the monitored network. The interface may be indicated by the human readable label specified in the SNMP data.

Each flow record for the monitored network is enriched based on the BGP information for the ingress device at which the flow entered the monitored network and the SNMP information for the other devices of the monitored network, the enrichment comprising exit information indicating the device and interface the ingress record is expected to exit the monitored network to its destination IP. By enriching the flow records as they are received, the exit information will reflect how traffic is routed through the network at that time, even if the BGP information and/or the SNMP information of the network changes. An automated or human analyst may, at a later time, query the stored flow records (e.g., query for flow records received from a particular source), and analyze the intended destinations of the flows and the egress device/interface in the network from which the flows exited the network, in order to determine how the network is utilized.

In accordance with some embodiments, a method for analyzing network traffic is provided. The method comprises collecting and reporting data from a plurality of network devices of a monitored network. The reporting data comprises routing data describing how the network devices route network traffic to different destinations (from their respective BGP routing table), as well as interface data describing interfaces of the plurality of devices (from SNMP-based polling of the respective devices). The method further comprises receiving a plurality of flow records from the plurality of network devices, a flow record describing corresponding network traffic passing through a network device, and enriching the plurality of flow records using the collected routing and interface data to produce enriched flow records, an enriched flow record including exit information indicating from which network device of the monitored network the network traffic corresponding to the flow record is expected to exit the monitored network. The exit information may further indicate additional information corresponding to the network device, such as a site of the network device, a particular interface of the device the flow is expected to exit through, etc. The enriched flow records are stored in a data store, and may be analyzed at a later time, the analysis using the exit information to determine how network traffic is routed through the monitored network.

In some embodiments, a method for analyzing network traffic is disclosed. The method comprises collecting reporting data from a plurality of network devices of a monitored network, the reporting data comprising routing data describing how the network devices route network traffic to different destinations, and interface data describing interfaces of the plurality of devices. The method may further comprise receiving a plurality of flow records from the plurality of network devices, a flow record describing corresponding network traffic passing through a network device. The method may further comprise enriching the plurality of flow records using the collected routing and interface data to produce enriched flow records, an enriched flow record including exit information indicating from which network device of the monitored network the network traffic corresponding to the flow record is expected to exit the monitored network. The method may further comprise storing the enriched flow records in a data store, and analyzing the enriched flow records, the analysis using the exit information to determine how network traffic is routed through the monitored network.

In some embodiments, enriching the plurality of flow records may comprise, for a particular flow record, determining a destination Internet Protocol (IP) address for the network traffic corresponding to the flow record, and identifying routing data associated with an ingress device through which the network traffic passed, the routing data mapping destination IP address values to next hop IP addresses, a next hop IP address indicating a device to which to send the network traffic to reach a mapped destination IP address. Enriching the flow records may further comprise associating a next hop IP address with the flow record, based upon the destination IP address of the flow record and the routing data associated with the ingress device, identifying an exit interface of an egress device of the plurality of network devices in communication with the next hop IP address using the collected interface data, and enriching the flow record using the identified exit interface. In some embodiments, the next-hop IP address indicates a device external to the monitored network.

In some embodiments, enriching the plurality of flow records comprises, for the flow record, identifying routing data associated with an ingress device through which the network traffic passed, the routing data mapping destination IP address values to next hop IP addresses, a next hop IP address indicating a device to which to send the network traffic to reach a mapped destination IP address. Enriching the flow record may further comprise associating a next-hop IP address with the flow record, based upon the destination IP address of the first flow record and the routing data associated with the ingress device, identifying a plurality of an exit interfaces of one or more egress devices of the plurality of network devices in communication with the next-hop IP address using the collected interface data, determining a proportion of network traffic routed through each of the plurality of identified exit interfaces to the next-hop IP address, selecting an exit interface from among the plurality of identified exit interfaces responsive to the determined proportion, and enriching the flow record responsive to the selected exit interface.

In some embodiments, the interface data includes labels associated with the interfaces of the plurality of devices, and analyzing the enriched flow records comprises receiving a query containing a label, identifying a set of ingress interfaces of the interfaces of the plurality of devices responsive to the label contained in the query, and analyzing the enriched flow records to identify where network traffic entering the monitored network at the identified set of ingress interfaces exits the monitored network.

In some embodiments, the method may further comprise constructing a global interface table using the reporting data collected from the plurality of network devices, the global interface table identifying exit interfaces of egress devices of the plurality of network devices in communication with the particular next hop IP address. Enriching the plurality of flow records may comprise determining a destination Internet Protocol (IP) address for the network traffic corresponding to the flow record, determining a next hop IP address for the network traffic corresponding to the flow record using the destination IP address, identifying an exit interface of an egress device of the plurality of network devices in communication with the destination ASN using the global interface table, and enriching the flow record using the identified exit interface.

In some embodiments, collecting the reporting data comprises receiving the routing data from the plurality of network devices at a first update frequency, and receiving the interface data from the plurality of network devices at a second update frequency, wherein the second update frequency is lower than the first update frequency.

In some embodiments, collecting the reporting data may comprise receiving current reporting data from the plurality of network devices, and discarding historical reporting data received from the plurality of network devices prior to the current reporting data responsive to receiving the current reporting data, wherein the plurality of flow records is enriched using the current reporting data.

In some embodiments, a system for analyzing network traffic is described. The system comprises a network monitoring engine configured to collect reporting data from a plurality of network devices of a monitored network, the reporting data comprising routing data describing how the network devices route network traffic to different destinations, and interface data describing interfaces of the plurality of devices. The system may further comprise a flow enrichment module, configured to receive a plurality of flow records from the plurality of network devices, a flow record describing corresponding network traffic passing through a network device, to enrich the plurality of flow records using the collected routing and interface data to produce enriched flow records, an enriched flow record including exit information indicating from which network device of the monitored network the network traffic corresponding to the flow record is expected to exit the monitored network, and to store the enriched flow records in a data store. The system may further comprise a network traffic analysis module configured to analyze the enriched flow records using the exit information to determine how network traffic is routed through the monitored network.

In some embodiments, a computer program product for analyzing network traffic is described. The computer program product comprises a non-transitory computer-readable storage medium containing computer program code that when executed cause one or more processors to collect reporting data from a plurality of network devices of a monitored network, the reporting data comprising routing data describing how the network devices route network traffic to different destinations, and interface data describing interfaces of the plurality of devices. The code when executed may further cause the one or more processors to receive a plurality of flow records from the plurality of network devices, a flow record describing corresponding network traffic passing through a network device, and enrich the plurality of flow records using the collected routing and interface data to produce enriched flow records, an enriched flow record including exit information indicating from which network device of the monitored network the network traffic corresponding to the flow record is expected to exit the monitored network. The code when executed may further cause the one or more processors to store the enriched flow records in a data store, and analyze the enriched flow records, the analysis using the exit information to determine how network traffic is routed through the monitored network.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
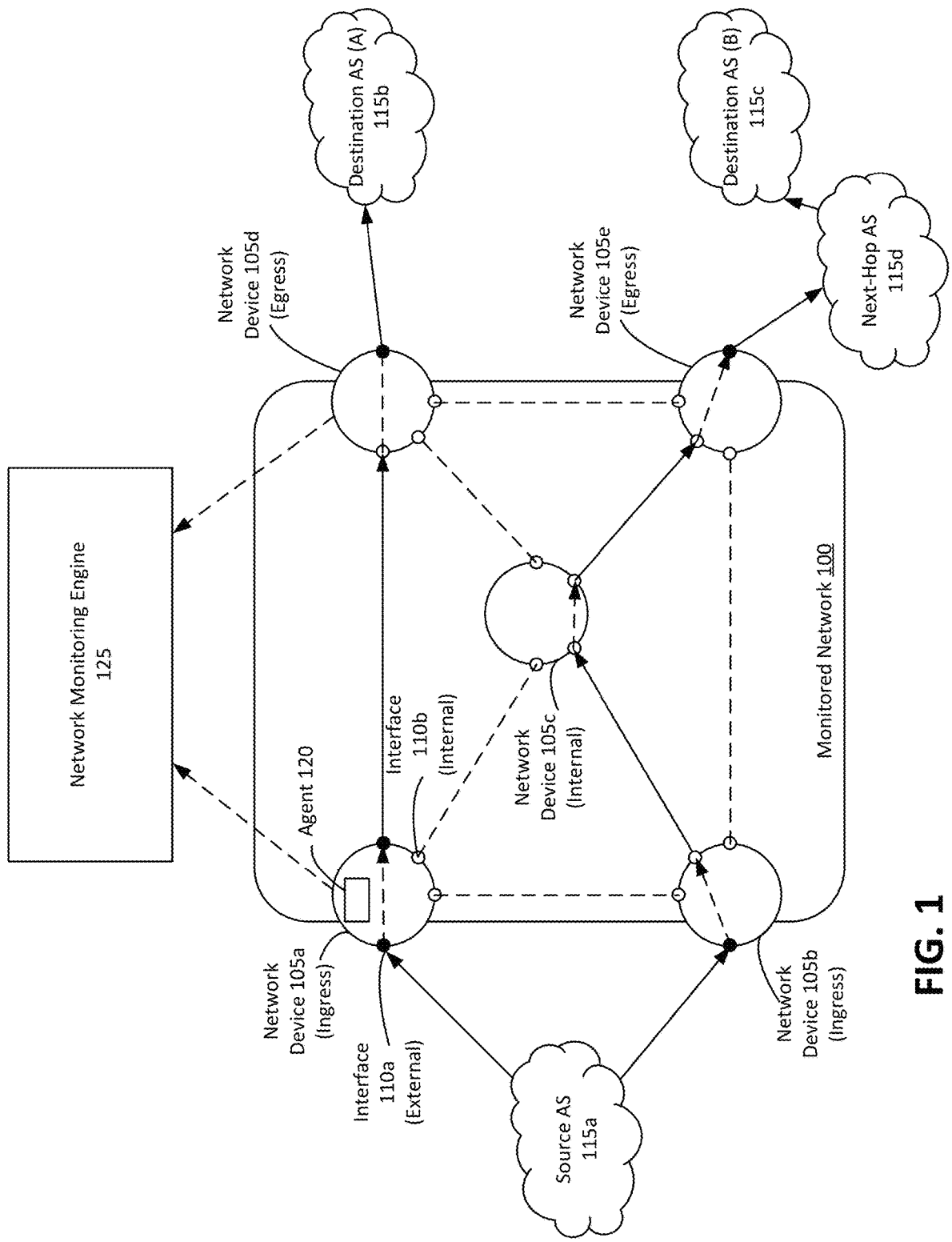
FIG. 1 illustrates a diagram of a network environment containing a monitored network and a network monitoring engine, in accordance with some embodiments.

FIG. 1 illustrates a diagram of a network environment containing a monitored network 100 and a network monitoring engine 125, in accordance with some embodiments. FIG. 1 also illustrates four autonomous systems (AS) 115 in communication with the monitored network 100. FIG. 1 uses like reference numerals to identify like elements. A letter after a reference numeral, such as "105a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a," "110b," and/or "110c" in the figures.

In one embodiment, the monitored network 100 is a transit network that transports data traffic from source networks to destination networks. For example, the monitored network may be operated by an Internet Service Provider (ISP) that carries traffic on behalf of other entities, a content delivery network that hosts and delivers content on behalf of other entities, or a networking provider that transports data for its own customers. The monitored network 100 is represented as an autonomous system (AS). The AS is a collection of Internet Protocol (IP) routing prefixes under control of a network operator and presents a common routing policy to the Internet and other autonomous systems. The monitored network 100 has a unique AS number that identifies the monitored network as supporting transit through itself to other autonomous systems.

The other autonomous systems 115 illustrated in FIG. 1 represent other networks than can send traffic through and/or receive traffic from the monitored network 100. For purposes of this description, one autonomous system 115a is labeled as a "source AS," meaning that it transmits data traffic to the monitored network 100. Two autonomous systems are labeled as "destination AS" 115b, 115c, meaning that these autonomous networks receive data traffic from the monitored network 100. Network traffic may transit the monitored network 100 in any direction, and an autonomous system 115 that acts as a source for particular traffic may also act as a destination for other traffic. FIG. 1 also illustrates an autonomous system labeled as a "next-hop AS" 115d. The next hop AS 115d represents an additional transit network located between the monitored network 100 and an ultimate destination AS 115c. For clarity, this description refers to an autonomous system 115 that receives traffic from the monitored network as a destination AS, even though the autonomous system may in fact be a next-hop AS that forwards the traffic to another ultimate destination AS.

The monitored network 100 transports the data traffic received from the source AS 115a through the monitored network to a destination AS. Generally, the data traffic can be represented as a flow from the source AS 115a to the destination AS 115b-d. Hence, the source AS 115a may be referred to as the upstream network while the destination AS 115b-d may be referred to as downstream networks.

The monitored network 100 has a set of network devices 105 that transport traffic within the network. The network devices 105 may be any type of device capable of transmitting network traffic, such as a router or switch. Each network device 105 has a set of interfaces 110. An interface 110 is a physical or logical port of a network device 105 capable of transmitting and/or receiving network traffic. Each interface may be connected to (e.g., able to communicate with) an interface of another network device, either of the monitored network 100 or another autonomous system. A network device 105 receives traffic on one interface, analyzes the traffic to determine its destination (e.g., the destination AS), and outputs the traffic on another interface that will send the traffic towards its destination. In some embodiments, the interfaces may be bi-directional, so an input interface can also function as an output interface and vice-versa. The network devices 105 of the monitored network 100 may be located at different geographic locations or sites.

Some of the network devices in FIG. 1 are labeled as ingress devices, internal devices, or egress devices. An ingress device, such as device 105a, includes at least one interface 110a that receives traffic from a source AS 115a. Thus, the ingress device receives traffic ingressing into the monitored network from another autonomous system 115. An internal network device, such as device 105c, has interfaces that only connect with other network devices within the monitored network 100. An internal network device accordingly routes data within the monitored network 100. An egress network device, such as device 105d, includes at least one interface that outputs traffic to a destination AS 115b-d. The egress network device sends traffic from the monitored network 100 to another autonomous system 115. In some embodiments, a particular network device 105 can function as both an ingress and egress device, depending upon how its interfaces are configured and to what other devices the interfaces are connected. In some embodiments, ingress and egress devices can be collectively referred to as "border" or "boundary" devices.

At least some of the network devices 105 execute agents (e.g., agent 120) that send flow records and reporting data from the network devices to the network monitoring engine 125. An agent may be a standalone software program, or may be a library statically or dynamically linked into other executing software on a network device. In some embodiments, agents are present on only network devices 105 that are acting as boundary devices (e.g., ingress and egress network devices). Although FIG. 1 only illustrates a single agent 120 on the network device 105a, it is understood that agents 120 may be installed on all boundary devices of the network 100 (e.g., ingress network devices 105a and 105b, and egress network devices 105d and 105e).

The flow records and reporting data sent by an agent 120 to the network monitoring engine 125 describes the operation and/or configuration of the associated network device 105. The flow records and reporting data may include data describing network traffic (e.g., packets) passing through the network device 105, but does not include the payload content carried by the traffic. In one embodiment, the reporting data include routing data and interface data.

Flow records describe data packets passing through the network device 105. In one embodiment, the network device 105 samples a subset of the data packets passing through the device, and creates network flow records from the samples, where a flow record describes characteristics of a corresponding sampled packet. For example, a flow record may comprise information indicating the source and destination IP addresses associated with the sampled packet, and interface information identifying the interfaces 110 of the network device 105 at which the packet was received. The flow records can be in the form of NetFlow data, IP Flow Information Export (IPFIX) data, sampled flow (sFlow) data, and/or other types of data. In some embodiments, only ingress devices provide flow records to the network monitoring engine 125. This may be done to avoid the network monitoring engine receiving flow records from different network devices 105 within the network 100 that correspond to the same flow is it travels to different devices within the network 100. The agent 120 may send the flow records to the network monitoring engine 125 in real time, as the data packets are sampled.

As discussed above, the boundary devices of the monitored network (e.g., ingress and egress devices) may send (e.g., using agents 120) reporting data to the network monitoring engine 125. The reporting data may include routing data and interface data, which can be used by the network monitoring engine 125 to enrich the received flow records. The routing data indicates how the network device 105 will route network traffic bound to different destination IP addresses. In some embodiments, the routing data is in the form of Border Gateway Protocol (BGP) data, such as a BGP routing information base (RIB). This data maps destination IP prefixes to particular next-hop IP addresses, which in turn indicates the next hop IP to which the network device 105 will route a packet with a particular destination IP address. Each network device may construct and maintain its own routing data by receiving routing updates from peer network devices. The routing data may change frequently as the network, and network conditions, change. Therefore, an embodiment of the agent 120 sends routing data to the network monitoring engine 125 frequently (e.g., every few minutes).

The interface data describes the interfaces of the network device 105. In some embodiments, the interface data is in the form of Simple Network Management Protocol (SNMP) data, and may include data such text strings in human-readable form that serve as labels for the interfaces. A label can be, for example, an interface name, interface description, interface ID, or the like. The interface data for an interface may describe a type, source, and/or destination of traffic passing through the interface. The interface data may be specified by the operator of the monitored network 100 and/or by another entity who configured the interfaces of the network device. For example, an inbound interface of a device that receives traffic from a particular source (e.g., an upstream network operated by a particular content provider) may be labeled with the name of the source. Likewise, an outbound interface of a device that sends traffic to a particular destination (e.g., a particular ISP) may be labeled with the name of the destination. The interface data typically changes infrequently. Therefore, an embodiment of the agent 120 sends the interface data to the network monitoring engine 125 less frequently than it sends the flow and routing data.

The network monitoring engine 125 monitors network traffic on the monitored network 100 by collecting and analyzing the reporting data received from the network devices 105. In one embodiment, the network monitoring engine 125 enriches the received flow records with additional information derived from the routing and interface data. Specifically, upon receiving a flow record from a network device 105 describing ingressing network traffic, the network monitoring engine 125 accesses the current routing and interface data and to determine from which device and interface the traffic is expected to exit (i.e., egress) the monitored network 100. The network monitoring engine 125 stores information describing the determined exit device/interface (called "exit information") in association with the flow record to form an enriched flow record. The network monitoring engine 125 enriches flow records in real time as the records are received.

Because flow record is enriched and stored based upon the routing and interface data of the monitored network 100 at the time it is received, the enriched flow records reflect the state of the monitored network 100 at the time the traffic corresponding to the flow record transited the monitored network, even if the routing and/or interface data for the monitored network later changes. The enriched flow records thus collectively describe how traffic is transiting the network over time, including where traffic entered and exited the network.

Enriching flow records in this manner provides numerous technical benefits. Enriching the flow records in real time removes the need for storing the routing and interface data over the long term. Therefore, the network monitoring engine 125 can discard historical routing and interface data as it is replaced by newer data. As a result, this enrichment technique improves computational efficiency by reducing computer storage demands. In addition, enriching the flow records in real time reduces computational requirements by eliminating the need to perform post-processing to correlate historical flow records with historical routing and interface data. These reduced storage and computational requirements allow the enrichment technique to scale easily to handle large networks with high volumes of traffic.

In addition, in some embodiments, enrichment of the flow records in real time can ensure that the impacts of any routing policy change of the network 100 can be reflected in near-real-time by the received flow records, whether these changes are operated by the administrators of the network 100, or by administrators of other networks (e.g., downstream networks 115b, 115c or 115d). This immediacy of ingress to egress information provides a great tactical advantage for network administrators for detecting routing issues and failures in real time, allowing them to take steps to rectify such issues.

The enriched flow records are useful for a variety of purposes. In one embodiment, the network monitoring engine 125 analyzes the enriched flow records to determine how the monitored network 100 is being utilized and to improve the performance of the network. For example, the monitored network 100 may be reconfigured to increase the amount of bandwidth available for high traffic connections, or to reroute certain connections through different devices at different sites (e.g., geographic locations), to allow for more efficient transmittal of network traffic from certain sources to certain destinations. In addition, by analyzing how incoming network traffic from a particular source exits the network, the cost of transiting network traffic from the source can be assessed. The enriched flow records may thus be used in traffic engineering to optimize the operation of the monitored network 100.

Figure 2:
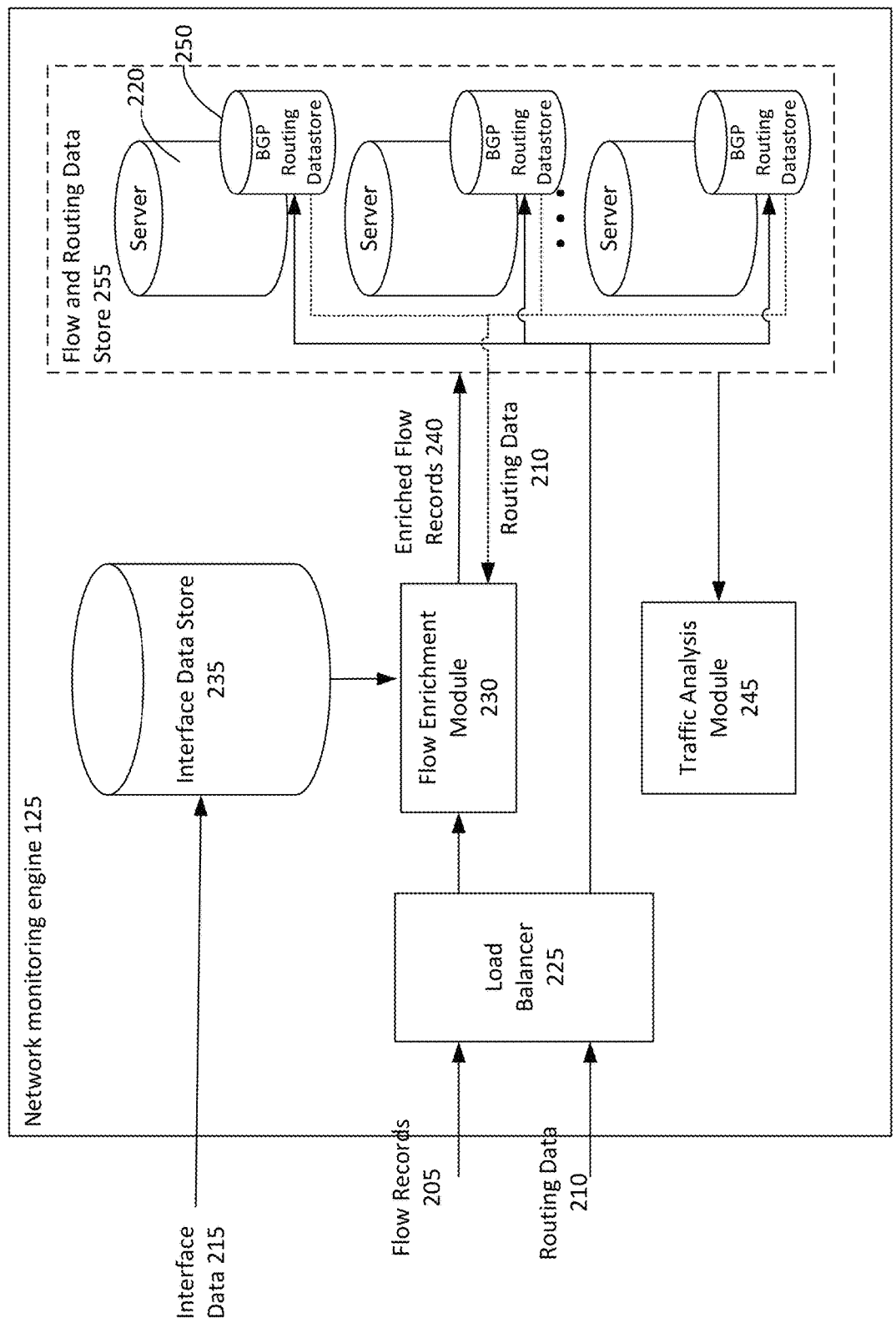
FIG. 2 illustrates a block diagram of the network monitoring engine, in accordance with some embodiments.

FIG. 2 illustrates a block diagram of the network monitoring engine 125, in accordance with some embodiments. FIG. 2 illustrates a particular configuration of elements, including a load balancer 225, data stores, and modules. Other embodiments of the network monitoring engine 125 include different elements and/or different configurations of the elements.

In particular, FIG. 2 illustrates that the network monitoring engine 125 includes a flow and routing data store 255. The flow and routing data store 255 may include multiple servers 220 for storing enriched flow records, and BGP routing datastores 250 for storing received routing data. In some embodiments the BGP routing datastores 250 may be implemented as part of the servers 250, or may correspond to separate devices.

In some embodiments, each server of the servers 220 within the flow and routing data store 255 stores enriched records for a particular subset of the network devices 105 of the monitored network 100. A server 220 includes working memory, such as random access memory (RAM) and persistent storage such as solid state and/or hard disk drives. The working memory supports faster data access and throughput compared to the persistent memory. In one embodiment, a BGP routing datastore 250 is implemented using the working memory (e.g., RAM) of the server to store received routing data 210, while the server 220 stores the enriched flow records 240 in the persistent memory. Storing the data and records in this way allows for efficient operation of the server during enrichment of the flow records. The routing data is frequently accessed during the enrichment process and storing the routing data in the working memory increases the speed of such access relative to if the routing data were stored in the persistent memory.

A load balancer 225 implemented as part of an ingest layer of the network monitoring engine 125 receives the flow records 205 and routing data 210 sent by the network devices 105 of the monitored network 100 and directs the records and data to particular servers 220 within a flow and routing data store 255. In some embodiments, the load balancer 225 is configured to direct flow record data 205 and routing data 210 received from particular network devices of the monitored network 100 to particular servers 220 within the flow and routing data store 255. For example, when flow record data 205 and/or routing data 210 is received from a particular network device 105 in the monitored network 100, the load balancer 225 accesses a data structure that maps network devices to servers 220 in the flow and routing data store 255. The load balancer 225 identifies the server 220 or set of servers assigned to the network device and routes the data to the identified server or set of servers. Load balancing in this manner allows the network monitoring engine 125 to scale efficiently to handle flow records and reporting data from different monitored networks.

FIG. 2 also illustrates that in one embodiment, the interface data 215 does not pass through the load balancer 225. Instead, the interface data 215 is received and stored by an interface data store 235. The interface data store 235 stores the interface data in a global interface table for the monitored network. The global interface table indicates, for each interface, a device ID corresponding to the network device the interface is on, an interface ID, an interface name, and an interface description. In addition, the global interface table indicates, for each interface, information corresponding to other interfaces that the interface can communicate with (e.g., an IP address, a netmask, and/or a subnet associated with other interfaces that the interface can communicate with).

The network monitoring engine 125 further contains a flow enrichment module 230. This module receives flow records 205 and routing info from the routing data store 250 on the servers 220, enriches the flow records to produce enriched flow records 240, and stores the enriched flow records in the flow and routing data store 255. While illustrated in FIG. 2 as being separate from the flow and routing data store 255, the flow enrichment module 230 may execute on the servers 220 within the flow data store 255. For example, each server 220 may execute local instance of the flow enrichment module 230 that enriches the flow records received by the server using interface data from the interface data store 235 and routing data from the corresponding BGP routing datastore 250, and stores the enriched flow records 240 on the server.

An enriched flow record 240 includes exit information. In some embodiments, the exit information comprises information describing the interface from which the network traffic corresponding to the flow record is expected to exit the monitored network 100. The exit information may indicate the interface, the network device the interface is on, and a site of the interface. For example, the flow record may be enriched using the following attributes: UE_site (indicating the site at which the network traffic is expected to exit the monitored network), UE_device (indicating the network device from which the network traffic is expected to exit the monitored network), and UE_interface (indicating the human-readable label of the interface at which the network traffic is expected to exit the monitored network), where UE stands for "ultimate exit" (e.g., indicating where the network traffic is expected to ultimately exit the network after it is received). In some embodiments, the enrichment attributes may be in the form of a tuple (UE_site, UE_device, UE_interface).

To enrich received flow records 205, the flow enrichment module 230 retrieves current routing data for the network device 105 from which the flow record was received from the appropriate BGP routing datastore 250 of the flow and routing data store 255, and also retrieves the interface data 215 from the interface data store 235. The retrieved interface data may be associated with a different network device, and is identified based upon the retrieved routing data. The routing and interface data for enriching each of the received flow records is retrieved as the flow records are received, and as such reflects the current state of the monitored network at the time the flow record was received. The flow enrichment module 230 modifies the flow record to include the exit information, and stores the enriched flow record to the appropriate server.

Because each flow record is enriched as it is received using the routing and interface data of the monitored network 100 current at the time, enriched flow records received over different time periods will indicate how the routing and/or interfaces of the monitored network existed at those points in time. The historical flow records thus function as a record of how the routing and interfaces of the monitored network changed over time, without needing to separately maintain historical routing and interface data. Furthermore, because no post-processing needs to be performed on the enriched flow records once they have been ingested and stored, analysis by the traffic analysis module 245 may be performed at any time independent of the receipt of flow records.

The network monitoring engine 125 further contains a traffic analysis module 245 that analyzes the flow of network traffic through the monitored network 100 using the enriched flow records 240. In some embodiments, the traffic analysis module 245 may be used to perform one or more queries on the stored enriched flow records. The queries can be used to determine how traffic is routed through the network. In particular, the queries can be used to show where traffic that enters the monitored network 100 through a particular interface or interfaces of one or more ingress device exits the network. Said another way, the query results show how traffic for a given destination traverses the monitored network.

These queries can leverage the labels of the interfaces provided in the interface data 215. The labels may identify particular sources or destinations by name or other identifier. Thus, queries can be performed to determine how traffic associated with particular labels is transiting the monitored network. For example, queries can be performed to identify all ingress interfaces receiving traffic from a particular content provider identified by a label, and to identify interfaces where the traffic from the particular provider is exiting the network. Likewise, queries can be performed to identify the ingress interfaces for network traffic egressing from particular interfaces. The traffic analysis module 245 may output the results of the queries in a human-readable format, such as one or more diagrams or graphs.

The traffic analysis module 245 may be configured to automatically perform queries on the monitored network 100 and analyze the results. The traffic analysis module 245 may also automatically reconfigure the monitored network 100 based on the results of the analysis. Such reconfigurations may optimize the operation of the monitored network 100 in an automated fashion. For example, the traffic analysis module 245 may configure the monitored network to more efficiently route network traffic from an external source through the network. For example, the traffic analysis module 245 may determine whether the amount of traffic from a particular ingress interface leaving the network from a particular egress interface exceeds a threshold and, if so, reconfigure the monitored network to cause some or all of this traffic to use a different egress interface. The traffic analysis module 245 may perform such reconfigurations by communicating with administrative interfaces of the network devices 105.

Figure 3:
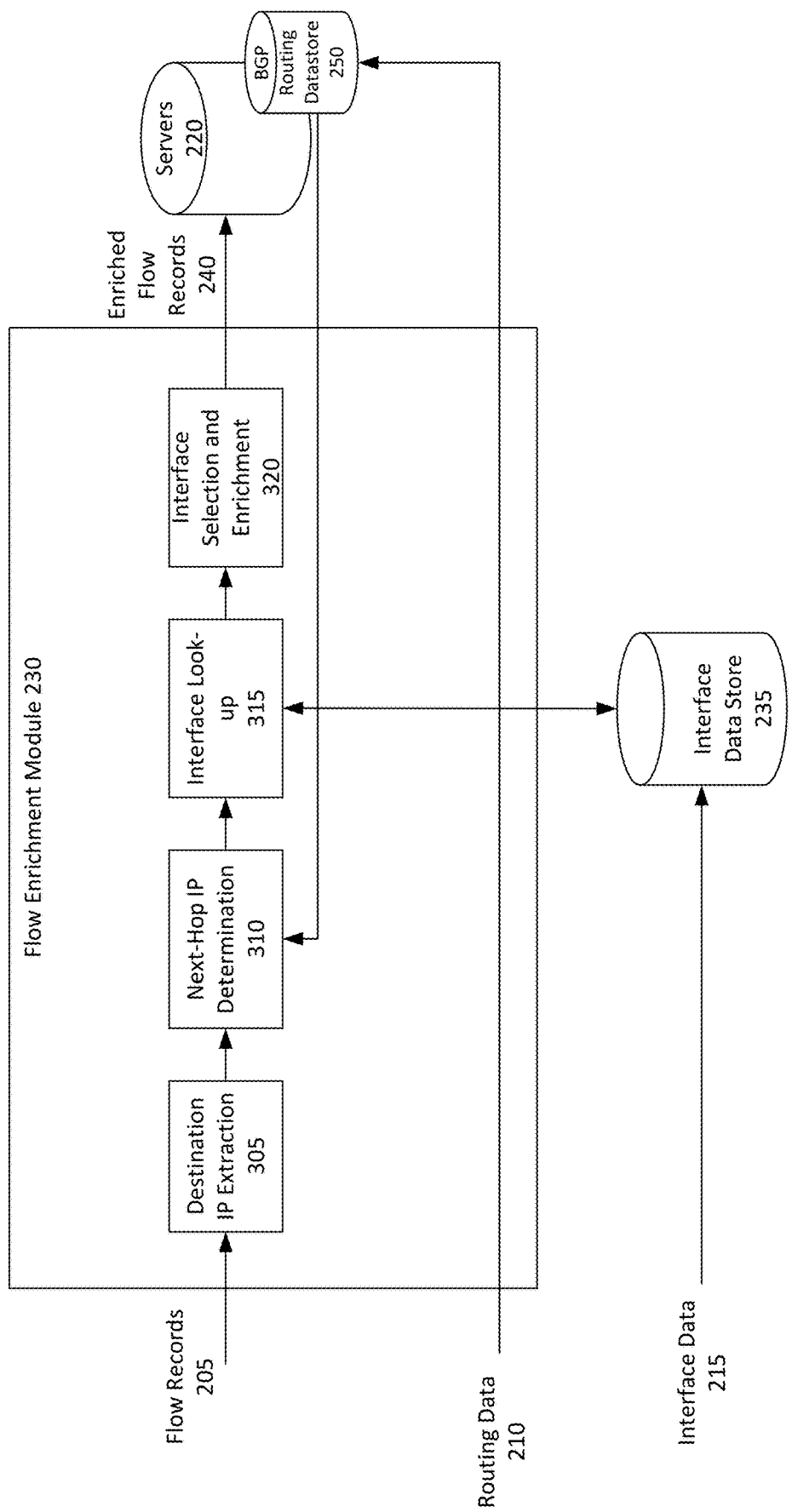
FIG. 3 illustrates a diagram of a flow enrichment module used to enrich received flow records, in accordance with some embodiments.
Figure 4:
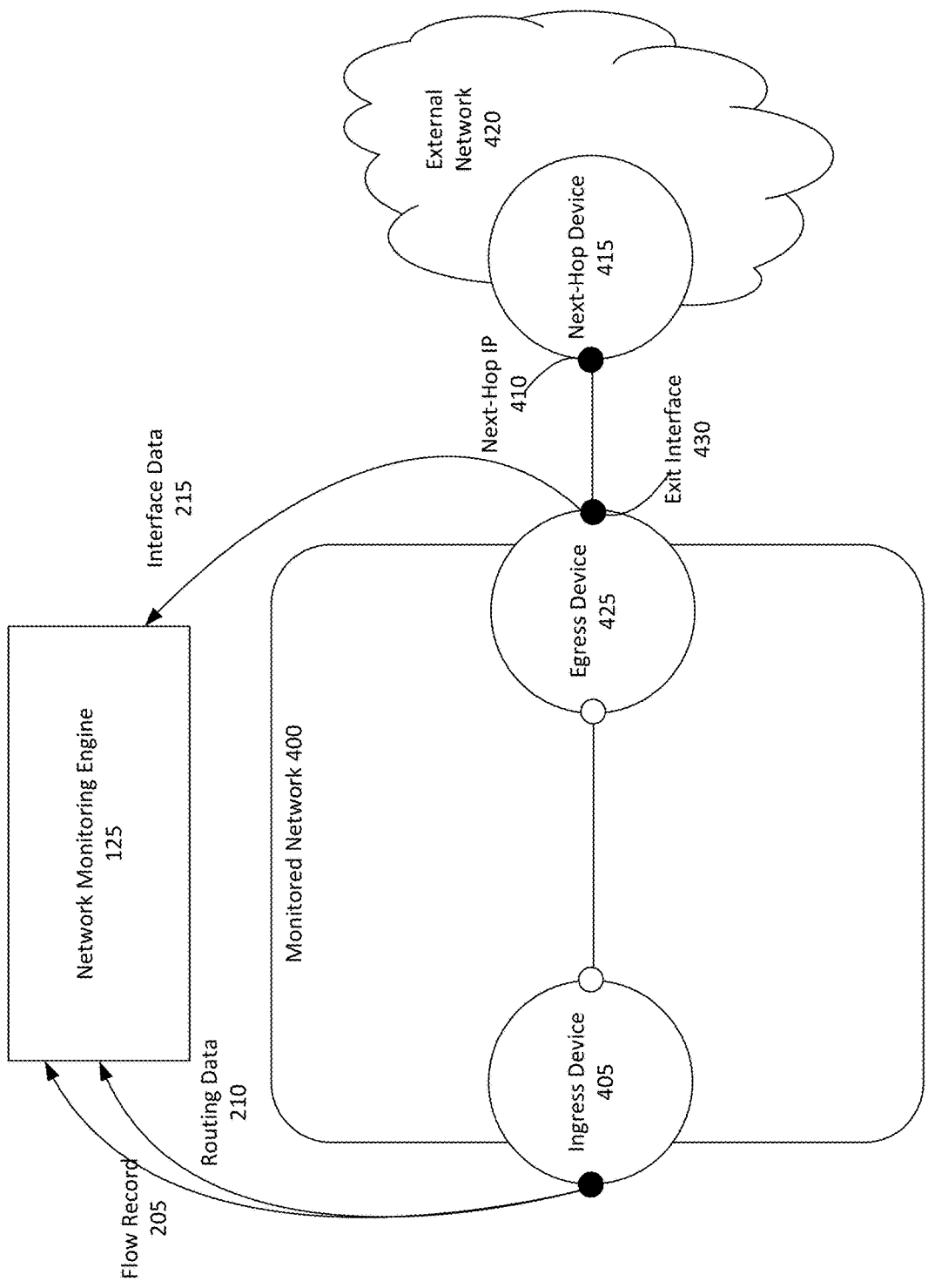
FIG. 4 illustrates a diagram showing the types of information provided by the network devices of the monitored network that are used by the flow enrichment module to enrich a flow record.

FIG. 3 illustrates a diagram showing how the flow enrichment module 230 used to enrich received flow records, in accordance with some embodiments. FIG. 4, in turn, illustrates a diagram showing the types of information provided by the network devices of the monitored network 100 that are used by the flow enrichment module 230 to enrich a flow record 205.

Starting with FIG. 4, the flow record 205 corresponds to network traffic received at an ingress device 405 of the monitored network 400. The flow record 205 is received by the network monitoring engine 125 from the ingress device 405. The flow record 205 includes a source IP address identifying the source of the network traffic corresponding to the flow record and a destination IP address identifying the ultimate destination of the network traffic.

The network monitoring engine 125 also receives current routing data 210 from the ingress device 405. The routing data received from the network device 405 describes routing and reachability information for the device, and indicates how the network device is currently routing traffic in the monitored network. In some embodiments, the routing data for the network device 405 (e.g., the BGP RIB) includes a plurality of tuples, each having an IP address range and a next hop IP address indicating the device to which the network device can forward network traffic to reach the IP addresses indicated in the IP address range. In some embodiments, the IP address range is expressed as an IP prefix, and represents the continuous range of IP addresses sharing that prefix. The network monitoring engine 125 further receives interface data 215 from an egress device 425 and stores the data in a global interface table.

Returning to FIG. 3, the flow enrichment module 230 contains a destination IP extraction module 305 that receives the flow record 205 and extracts the destination IP address from it. In some embodiments, the destination IP extraction module further determines a destination Autonomous System Number (ASN) corresponding to the destination AS for the received flow record that is mapped to the destination IP. In some embodiments, the flow record 205 is enriched using the ASNs of the source and destination AS's, allowing for later analysis to more easily query the stored enriched flow records based upon sources or destinations ASNs of the flow records.

A next-hop IP determination module 310 receives the flow record and the destination IP address and determines a next-hop IP address based upon the destination IP address and current routing data for the monitored network as received from the appropriate BGP routing datastore 250 on the related server 220. The next-hop IP address indicates an IP address of device to which the network is routing the traffic corresponding to the flow record, based on the destination IP address. The next-hop IP address may be an IP address of an external device that is outside the monitored network 100. For example, the next hop IP address may reference the IP address of an ingress device of a network downstream from the monitored network 100. In some cases, the next-hop IP address may correspond to a next-hop self device and point to another interface within the monitored network 100. The next-hop self device may rewrite the next-hop when the flow is received. As such, the next-hop IP address may correspond to a device external to the monitored network or within the monitored network.

The next-hop IP determination module 310 determines the next hop IP address by retrieving the routing data of the ingress device from which the flow record 205 was received and identifies an IP range indicated in the routing data corresponding to the flow record's destination IP address. Using the identified IP range, the next-hop IP determination module 310 determines a next hop IP address corresponding to the IP range, based upon mappings indicated in the retrieved routing data. For example, as illustrated in FIG. 4, the next hop IP address corresponds to an interface 410 of a next hop network device 415. The next hop network device 415 is a network device on an external network 420 that, according to the routing information of the ingress device 405, will receive network traffic intended for IP addresses within the identified IP range directly from a network device of the monitored network 400.

An interface look-up module 315 receives the determined next hop IP address 410, and looks up the determined next hop IP address 410 in the global interface table stored in the interface data store 235. Using the determined next hop IP address, the interface look-up module 315 identifies at least one interface in the global interface table that transmits to the next hop IP address 415. For example, as illustrated in FIG. 4, the egress device 425 provides interface data 215 associated with its interfaces to the network monitoring engine 125, to be used in constructing the global interface table. The interface data provided by the egress device 425 indicates that the exit interface 430 of the egress device 425 is in communication with the interface on an external network 420 that corresponds to the next hop IP address 410. Thus, using the determined next hop IP address 410, the interface look-up module 315 is able to determine, using the global interface table, the exit interface 430 of the monitored network 400 that transmits network traffic to the next hop device 415.

In some embodiments, the interface look-up module 315 may identify more than one interface of the monitored network 100 that communicates with the next hop IP address. In other cases, the interface look-up module 315 may be unable to identify an interface from the global interface table, in which case the attributes of the exit information for enriching the flow record 205 (e.g., UE_interface, UE_device, UE_site) may be set to NULL.

The interface selection and enrichment module 320 receives information corresponding to the interface(s) identified by the interface look-up module 315 (e.g., the exit interface 430) and uses the received information to enrich the flow record 205 to produce the enriched flow record 240. The interface selection and enrichment module 320 enriches the flow record 205 with exit information indicating the ID of the interface (UE_interface), the device containing the interface (UE_device), and a site that the device is located (UE_site).

In some embodiments, the interface look-up module 315 finds at least one interface using the determined next hop IP address, based upon two different types of matches: exact match or subnet match. An exact match may be found if there is a monitored network device that has an interface configured to communicate with an IP address matching the next hop IP address. In some embodiments, an exact match indicates a next-hop self device within the monitored network. On the other hand, a subnet match is found if there is a monitored network device that has an interface configured to communicate with an IP address in the same subnet as the next hop IP address. In some embodiments, one or more matching interfaces may be returned in order of priority (i.e., exact matches having higher priority than subnet matches).

In cases where the interface look-up module 315 identifies more than one possible exit interface, the interface selection and enrichment module 320 selects an interface from the one or more possible interfaces for use in enriching the flow record. In some embodiments, the interface selection and enrichment module 320 enriches the flow record using the site and device of matching interface (e.g., setting UE_device and UE_site to the device and site having the interface matching the next hop IP). However, the interface for enriching the flow record (e.g., UE_interface) may not be immediately set to the determined matching interface indicated by the global interface table.

Instead, in some embodiments, to determine the interface to be used for enriching the flow record (e.g., UE_interface), the network monitoring engine 125 maintains mappings for the interfaces of the monitored network 100 that tracks the amount of traffic through each interface to different destinations. The mappings comprise entries for each interface and specify amounts of network traffic that passes through the interface to different destination ASNs (e.g., top n ASNs, such as top 100 ASNs). For example, the mappings may indicate a device ID, an interface ID, an interface name, an interface description, a destination ASN, and an amount of traffic sent through the interface to the destination ASN (e.g., number of bytes) over a sliding time period. The destination ASNs may correspond to destination IP addresses indicated in the flow records of the network traffic. In some embodiments, the mappings are only maintained for interfaces indicated in the global interface table as being external interfaces.

The network traffic (e.g., top destination ASNs) for each interface of the network device is analyzed to select which interface is to be used for the exit information enriching the flow record. For example, if a single interface is found that contains the ASN corresponding to the destination IP address of the flow record as one of its top ASNs, then that interface may be used to enrich the received flow record. On the other hand, if multiple interfaces are found (e.g., multiple interfaces have top ASN corresponding to the destination IP address of the flow record), the interface for the exit information may be selected based upon the amount network traffic towards the destination ASN seen on each interface (e.g., based upon the proportion of network traffic to the destination ASN through each interface). For example, received flow records having the same destination IP may be distributed between multiple interfaces based upon the proportion of network traffic through the respective interfaces to the destination IP as recorded by the mappings (e.g., if 75% of the traffic to the destination IP goes through a first interface, and 25% through a second interface, the first interface may be selected for enriching ingested flow records indicating traffic to the destination IP 75% of the time).

Figure 5:
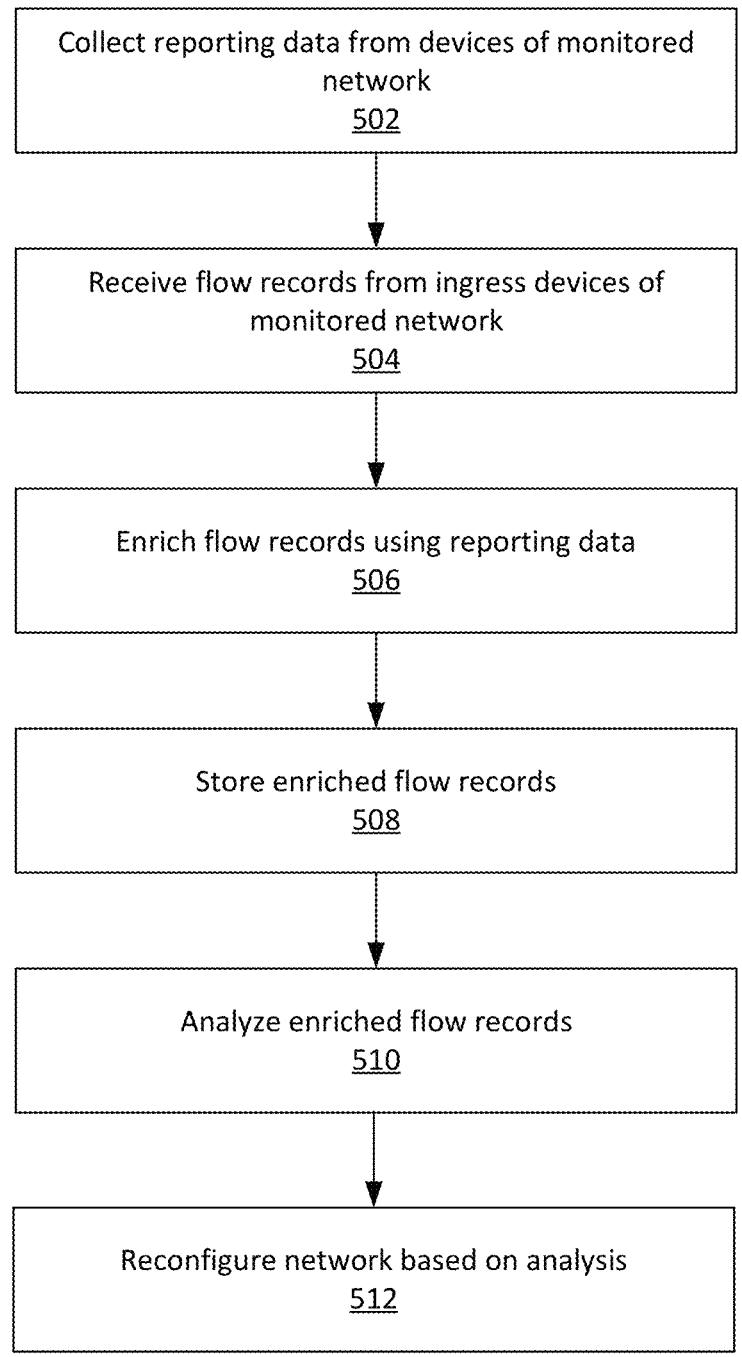
FIG. 5 illustrates a flowchart of a process for enriching incoming flow records with exit information, in accordance with some embodiments.

FIG. 5 illustrates a flowchart of a process for using enriched flow records in traffic engineering to improve the performance of a network according to one embodiment. Different embodiments of the process may include different and/or additional steps, or perform the steps in different orders. While this description ascribes the steps of the process to the network monitoring engine 125, steps of the process may be performed by other entities in other embodiments.

The network monitoring engine 125 collects 502 reporting data from network devices 105 of a monitored network 100. The reporting data includes routing data indicating how the respective network devices 105 will route network traffic bound for different destination IP addresses. The reporting data also includes interface data describes the interfaces of the network devices 105. In some embodiments, the routing data includes BGP routing data, while the interface data includes SNMP data. The routing and interface data may be received at different rates. For example, the routing data may be received at a higher rate (i.e., more often, at a higher frequency) while the interface data may be received at a lower rate relative to the routing data (i.e., less often, at a lower frequency). The network monitoring engine 125 stores the reporting data.

The network monitoring engine 125 receives 504 flow record from ingress devices of the monitored network 100. A flow record describes network traffic (e.g., data packets) passing through the network device 105. The flow record identifies the source and destination IP addresses for the traffic, as well as the ingress interface of the network device 105 on which the network traffic was received.

The network monitoring engine 125 enriches 506 the received flow records using the current routing and interface data of the monitored network 100. An enriched flow record includes exit data indicating where the network traffic of the flow record is expected to exit the monitored network. The exit data may indicate a network device 105, and an interface of the device from which the network traffic is expected to exit the monitored network 100.

The network monitoring engine 125 stores 508 the enriched flow records. Because the network monitoring engine 125 enriches flow records as they are received from the monitored network 100 using routing and interface data that reflect the state of the network at the time the flow records are received, enriched flow records stored over different time periods can provide a record of how the network changed over the different time periods. In addition, the network monitoring engine 125 does not need to save historical routing and interface data because the relevant information from the data is incorporated into the enriched flow records.

The network monitoring engine 125 analyzes 510 the enriched flow records to determine how traffic is routed through the monitored network 100. The analysis may take the form of one or more queries that determine where particular traffic ingresses and egresses the network. The results of the queries can be output as reports in the form of diagrams and/or graphs. In one embodiment, the network monitoring engine 125 automatically reconfigures 512 the monitored network 100 based on the analysis. This reconfiguration may adjust the network in order to more efficiently route the network traffic. For example, one or more connections between different interfaces within the monitored network may be adjusted or rerouted based upon how the network traffic from one or more sources is passed through the monitored network. Because the flow records are stored by the network monitored engine 125 after enrichment, without any needed post-processing, the analysis of the enriched flow records may be performed at any time and may account for all flow records that have been stored at the time of analysis.

Figure 6:
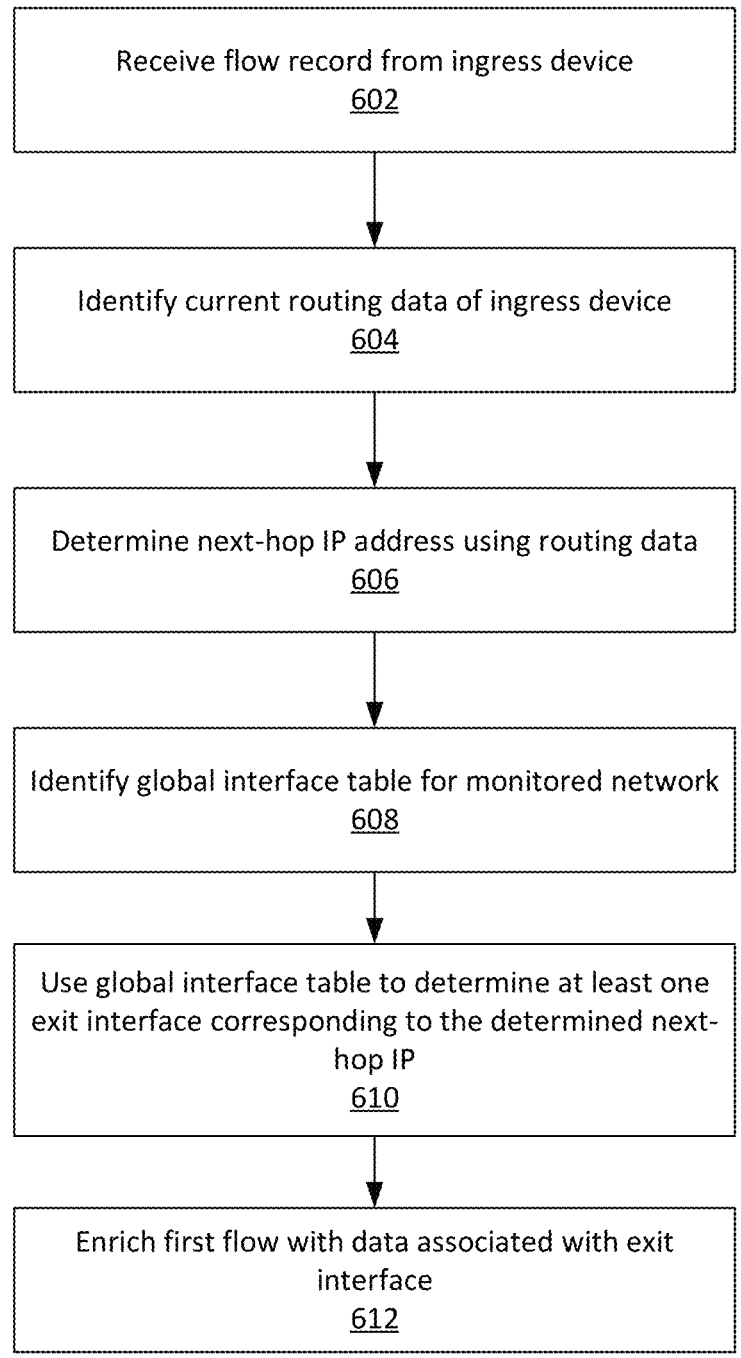
FIG. 6 illustrates a flowchart of a process for enriching a received flow record, in accordance with some embodiments.

FIG. 6 illustrates a flowchart of a process for enriching a received flow record, in accordance with some embodiments. Different embodiments of the process may include different and/or additional steps, or perform the steps in different orders. While this description ascribes the steps of the process to the network monitoring engine 125, steps of the process may be performed by other entities in other embodiments.

The network monitoring engine 125 receives 602 a flow record describing network traffic that transited through an ingress device of the monitored network 100. The received flow record indicates a destination IP address for the traffic. The network monitoring engine 125 identifies 604 current routing data for the ingress device associated with the received flow record. The routing data may comprise a set of tuples mapping IP address ranges to next hop IP addresses. In some embodiments, the routing data may be in the form of a BGP RIB. The network monitoring engine 125 identifies an IP address range based upon the destination IP of the flow record, and determines 606 the next hop IP address corresponding to the IP address range.

The network monitoring engine 125 further identifies 608 a global interface table for the monitored network 100. The global interface table is constructed based upon interface data received from network devices of the monitored network 100, and indicates for each interface, the network device containing the interface, a site of the network device, a label for the interface, and/or the like.

The network monitoring engine 125 uses the global interface table to identify 610 the exit device of the monitored network 100 corresponding to the determined next hop IP address. The device has at least one exit interface labeled as an external interface on a network device of the monitored network 100 that communicates with the destination ASN. In some embodiments, more than one potential interface may be identified, whereupon the network monitoring engine 125 may select a particular interface based upon observed traffic volumes to the destination IP address of the flow record over a period of time or other factors.

The network monitoring engine 125 enriches 612 the flow record based upon the identified interface. For example, the flow record may be enriched with attributes indicating the interface, the device of the interface, and a site of the device having the interface.

As such, the flow record received at an ingress device can be enriched based upon the current routing data of the ingress device, and interface data of a different device (e.g., an egress device) of the monitored network. For example, the routing data of the ingress device can be used to determine a next hop IP for the flow record, which is then used to identify an egress device for the flow record, based upon interface information provided to the network monitoring engine by the egress device.

By enriching the flow records as they are ingested, the flow records can be enriched to reflect the current routing and interface data of the monitored network, even if the routing and/or interface data of the monitored network may change later. The enriched flow records can then be aggregated and analyzed at a later time, without the need for keeping track of changes to the routing or interface data of the monitored network in the intervening time. Analysis of the enriched flow records may be done to determine how network traffic from different external sources is routed through the network, how the routing of network traffic within the network changed over time, and/or the like. The results of the analysis can be used to reconfigure or optimize the network, such as by rerouting connections between different devices and interfaces to allow for common flows of traffic (e.g., from a particular source to a particular destination) to be passed through the network in a more efficient manner.

Other Embodiments

Figure 7:
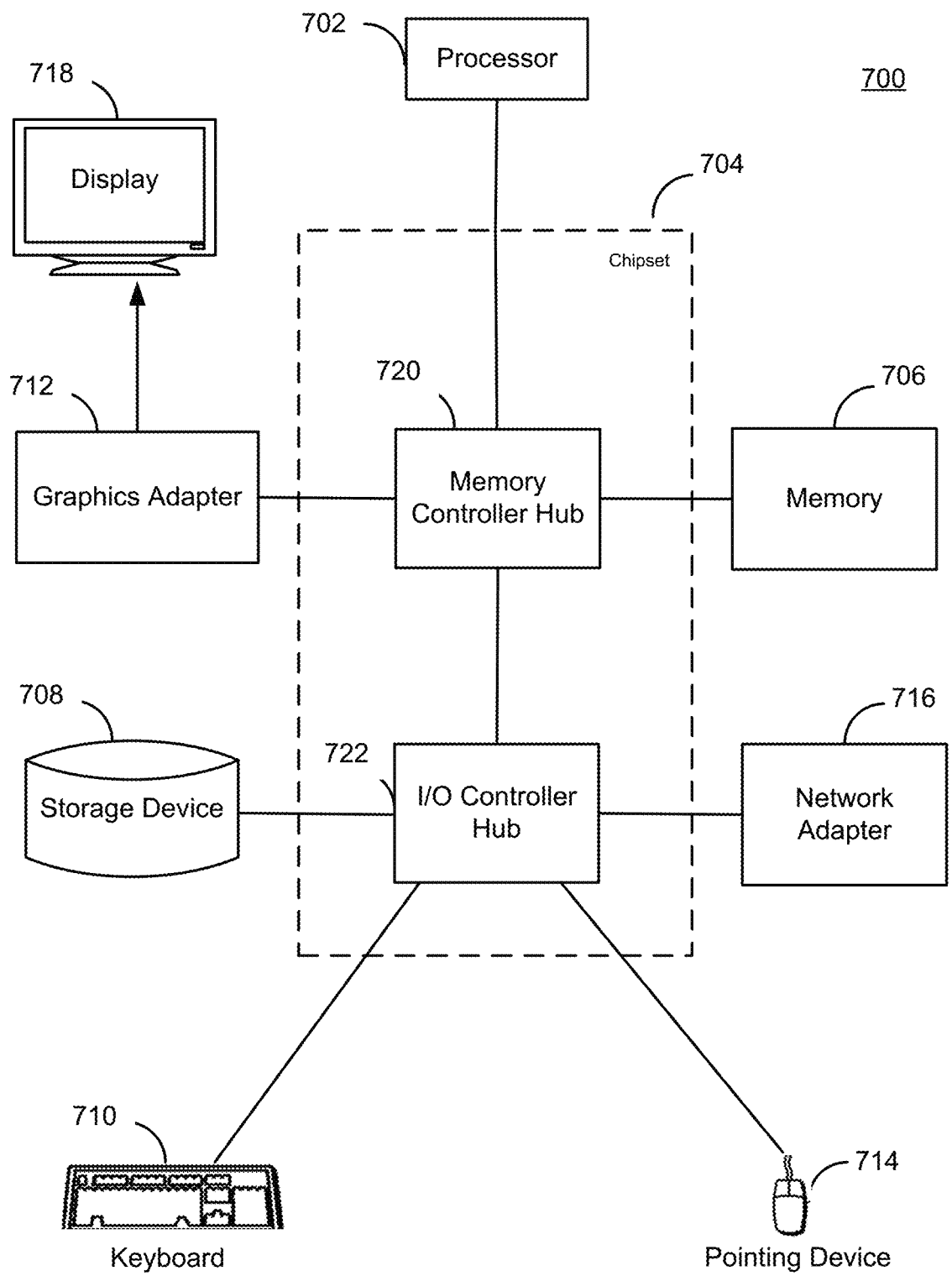
FIG. 7 is a high-level block diagram of a computer that may act as a network device or a network monitoring engine, in accordance with some embodiments.

The entities shown in preceding figures are implemented using one or more computers. FIG. 7 is a high-level block diagram of a computer 700 for acting as a network device (e.g., network device 105) or a network monitoring engine (e.g., the network monitoring engine 125) in one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 500. The graphics adapter 712 displays images and other information on the display 718. The network adapter 716 couples the computer system 700 to a network (not shown).

As is known in the art, a computer 700 can have different and/or other components than those shown in FIG. 7. In addition, the computer 700 can lack certain illustrated components. For example, the computer acting as the network monitoring engine 125 can be formed of multiple blade servers linked together into one or more distributed systems and lack components such as keyboards and displays. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for analyzing network traffic, comprising:
    collecting, at a network monitoring engine, reporting data from a plurality of network devices of a monitored network, the reporting data comprising:
        routing data describing how the plurality of network devices route network traffic to different destinations, and
        interface data used to construct a global interface table maintained in an interface data store, the global interface table storing information describing interfaces of the plurality of network devices of the monitored network, including exit interfaces of a plurality of egress devices of the plurality of network devices;
    receiving, at the network monitoring engine, a plurality of flow records from one or more ingress devices of the plurality of network devices, each flow record describing corresponding network traffic passing through a corresponding ingress device of the one or more ingress devices;
    enriching, at the network monitoring engine, each of the plurality of flow records using the collected routing and interface data to produce enriched flow records, each enriched flow record including exit information indicating from which network device of the monitored network the network traffic corresponding to the flow record is expected to exit the monitored network, wherein enriching a flow record of the plurality of flow records comprises:
        using routing data associated with an ingress device of the one or more ingress devices at which the flow record was received to determine a next hop address for the flow record, the next hop address indicating a device external to the monitored network to which to send the network traffic to reach a destination address associated with the flow record;
        analyzing the maintained global interface table describing interfaces of the plurality of network devices of the monitored network using the determined next hop address, to identify one or more exit interfaces of one or more egress devices of the plurality of network devices different from the ingress device, wherein the one or more exit interfaces are in communication with the determined next hop address; and
        enriching the flow record based upon the one or more identified exit interfaces;
    storing the enriched flow records in a data store; and
    analyzing the enriched flow records, the analysis using the exit information to determine how network traffic is routed through the monitored network.

2. The method of claim 1, wherein enriching flow record further comprises:
    determining a destination Internet Protocol (IP) address for the network traffic corresponding to the flow record;
    wherein the routing data associated with the ingress device corresponding to the flow record maps destination IP address values to next hop IP addresses each indicating a device external to the monitored network to which to send the network traffic to reach a respective mapped destination IP address; and
    using the routing data to determine the next hop address comprises associating a next hop IP address of the next hop IP addresses with the flow record, based upon the destination IP address of the flow record and the routing data associated with the ingress device.

3. The method of claim 1, wherein the one or more identified exit interfaces comprises a plurality of exit interfaces, each in communication with the next hop address, and wherein enriching the flow record further comprises:
    determining a proportion of network traffic routed through each of the plurality of identified exit interfaces to the next hop address;
    selecting an exit interface from among the plurality of identified exit interfaces responsive to the determined proportion; and
    enriching the flow record responsive to the selected exit interface.

4. The method of claim 1, wherein the interface data includes labels associated with the interfaces of the plurality of devices and analyzing the enriched flow records comprises:
receiving a query containing a label;
identifying a set of ingress interfaces of the interfaces of the plurality of devices responsive to the label contained in the query; and
analyzing the enriched flow records to identify where network traffic entering the monitored network at the identified set of ingress interfaces exits the monitored network.

5. The method of claim 1, wherein enriching the flow record further comprises:
determining a destination Internet Protocol (IP) address for the network traffic corresponding to the flow record;
determining the next hop address for the network traffic corresponding to the flow record using the destination IP address;
using the global interface table, identifying the one or more exit interfaces of the one or more egress devices as an exit interface identified in the global interface table as being in communication with an Autonomous System Number (ASN) associated with the determined destination IP address.

6. The method of claim 1, wherein collecting the reporting data comprises:
receiving the routing data from the plurality of network devices at a first update frequency; and
receiving the interface data from the plurality of network devices at a second update frequency, wherein the second update frequency is lower than the first update frequency.

7. The method of claim 1, wherein collecting the reporting data comprises:
receiving current reporting data from the plurality of network devices; and
discarding historical reporting data received from the plurality of network devices prior to the current reporting data responsive to receiving the current reporting data, wherein the plurality of flow records is enriched using the current reporting data.

8. The method of claim 1, wherein the routing data comprises BGP data, and the interface data comprises SNMP data.

9. A system for analyzing network traffic, comprising:
a processor;
a memory in communication with the processor, the memory storing programming instructions executable by the processor to:
collect, at a network monitoring engine, reporting data from a plurality of network devices of a monitored network, the reporting data comprising:
routing data describing how the plurality of network devices route network traffic to different destinations, and
interface data used to construct a global interface table maintained in an interface data store, the global interface table storing information describing interfaces of the plurality of network devices of the monitored network, including exit interfaces of a plurality of egress devices of the plurality of network devices;
receive, at the network monitoring engine, a plurality of flow records from one or more ingress devices of the plurality of network devices, each flow record describing corresponding network traffic passing through a corresponding ingress device of the one or more ingress devices,
enrich, at the network monitoring engine, each of the plurality of flow records using the collected routing and interface data to produce enriched flow records, each enriched flow record including exit information indicating from which network device of the monitored network the network traffic corresponding to the flow record is expected to exit the monitored network, wherein enriching a flow record of the plurality of flow records comprises:
using routing data associated with an ingress device of the one or more ingress devices at which the flow record was received to determine a next hop address for the flow record, the next hop address indicating a device external to the monitored network to which to send the network traffic to reach a destination address associated with the flow record;
analyzing the maintained global interface table describing interfaces of the plurality of network devices of the monitored network using the determined next hop address, to identify one or more exit interfaces of one or more egress devices of the plurality of network devices different from the ingress device, wherein the one or more exit interfaces are in communication with the determined next hop address; and
enriching the flow record based upon the one or more identified exit interfaces; and
store the enriched flow records in a data store; and
analyze the enriched flow records using the exit information to determine how network traffic is routed through the monitored network.

10. The system of claim 9, wherein the programming instructions are further executable by the processor to enrich the flow record by:
determining a destination Internet Protocol (IP) address for the network traffic corresponding to the flow record;
wherein the routing data associated with the ingress device corresponding to the flow record maps destination IP address values to next hop IP addresses each indicating a device external to the monitored network to which to send the network traffic to reach a respective mapped destination IP address; and
using the routing data to determine the next hop address comprises associating a next hop IP address of the next hop IP addresses with the flow record, based upon the destination IP address of the flow record and the routing data associated with the ingress device.

11. The system of claim 9, wherein the one or more identified exit interfaces comprises a plurality of exit interfaces and wherein the programming instructions are further executable by the processor to:
determine a proportion of network traffic routed through each of the plurality of identified exit interfaces to a destination ASN associated with a destination IP address of the flow record;
select an exit interface from among the plurality of identified exit interfaces responsive to the determined proportion; and
enrich the flow record responsive to the selected exit interface.

12. The system of claim 9, wherein the interface data includes labels associated with the interfaces of the plurality of devices, and wherein the programming instructions are further executable by the processor to analyze the enriched flow records by:
  receiving a query containing a label;
  identifying a set of ingress interfaces of the interfaces of the plurality of devices responsive to the label contained in the query; and
  analyzing the enriched flow records to identify where network traffic entering the monitored network at the identified set of ingress interfaces exits the monitored network.

13. The system of claim 9, wherein the programming instructions are further executable by the processor to enrich the flow record by:
  determining a destination Internet Protocol (IP) address for the network traffic corresponding to the flow record;
  determining the next hop address for the network traffic corresponding to the flow record using the destination IP address;
  using the global interface table, identifying the one or more exit interfaces of the one or more egress devices as an exit interface identified in the global interface table as being in communication with an Autonomous System Number (ASN) associated with the determined destination IP address.

14. The system of claim 9, wherein the network monitoring engine is configured to collect the reporting data by:
  receiving the routing data from the plurality of network devices at a first update frequency; and
  receiving the interface data from the plurality of network devices at a second update frequency, wherein the second update frequency is lower than the first update frequency.

15. The system of claim 9, wherein the network monitoring engine is configured to collect the reporting data by:
  receiving current reporting data from the plurality of network devices; and
  discarding historical reporting data received from the plurality of network devices prior to the current reporting data responsive to receiving the current reporting data, wherein the plurality of flow records is enriched using the current reporting data.

16. A computer program product for analyzing network traffic, the computer program product comprising a non-transitory computer-readable storage medium containing computer program code that when executed cause one or more processors to:
  collect, at a network monitoring engine, reporting data from a plurality of network devices of a monitored network, the reporting data comprising:
    routing data describing how the plurality of network devices route network traffic to different destinations, and
    interface data used to construct a global interface table maintained in an interface data store, the global interface table storing information describing interfaces of the plurality of network devices of the monitored network, including exit interfaces of a plurality of egress devices of the plurality of network devices;
  receive, at the network monitoring engine, a plurality of flow records from one or more ingress devices of the plurality of network devices, each flow record describing corresponding network traffic passing through a corresponding ingress device of the one or more ingress devices;
  enrich, at the network monitoring engine, each of the plurality of flow records using the collected routing and interface data to produce enriched flow records, each enriched flow record including exit information indicating from which network device of the monitored network the network traffic corresponding to the flow record is expected to exit the monitored network, wherein enriching a flow record of the plurality of flow records comprises:
    using routing data associated with an ingress device of the one or more ingress devices at which the flow record was received to determine a next hop address for the flow record, the next hop address indicating a device external to the monitored network to which to send the network traffic to reach a destination address associated with the flow record;
    analyzing the maintained global interface table describing interfaces of the plurality of network devices of the monitored network using the determined next hop address, to identify one or more exit interfaces of one or more egress devices of the plurality of network devices different from the ingress device, wherein the one or more exit interfaces are in communication with the determined next hop address; and
    enriching the flow record based upon the one or more identified exit interfaces;
  store the enriched flow records in a data store; and
  analyze the enriched flow records, the analysis using the exit information to determine how network traffic is routed through the monitored network.

17. The computer program product of claim 16, wherein the computer program code further causes the processor to enrich the flow record by:
  determining a destination Internet Protocol (IP) address for the network traffic corresponding to the flow record;
  wherein the routing data associated with the ingress device corresponding to the flow record maps destination IP address values to next hop IP addresses each indicating a device external to the monitored network to which to send the network traffic to reach a respective mapped destination IP address; and
  using the routing data to determine the next hop address comprises associating a next hop IP address of the next hop IP addresses with the flow record, based upon the destination IP address of the flow record and the routing data associated with the ingress device.

18. The computer program product of claim 16, wherein the one or more identified exit interfaces comprises a plurality of exit interfaces, and wherein the computer program code further causes the processor to enrich the flow record by:
  determining a proportion of network traffic routed through each of the plurality of identified exit interfaces to the next hop address;
  selecting an exit interface from among the plurality of identified exit interfaces responsive to the determined proportion; and
  enriching the flow record responsive to the selected exit interface.

19. The computer program product of claim 16, wherein the interface data includes labels associated with the interfaces of the plurality of devices, and the computer program code further causes the one or more processors to analyze the enriched flow records by:
  receiving a query containing a label;

identifying a set of ingress interfaces of the interfaces of the plurality of devices responsive to the label contained in the query; and analyzing the enriched flow records to identify where network traffic entering the monitored network at the identified set of ingress interfaces exits the monitored network.

20. The computer program product of claim 16, wherein the programming instructions are further executable by the processor to enrich the flow record by:

determining a destination Internet Protocol (IP) address for the network traffic corresponding to the flow record;

determining a next hop IP address for the network traffic corresponding to the flow record using the destination IP address;

using the global interface table, identifying the exit interface of the egress device as an interface identified in the global interface table as being in communication with the next hop IP address.

21. The computer program product of claim 16, wherein the computer program code causes the one or more processors to collect the reporting data by:

receiving the routing data from the plurality of network devices at a first update frequency; and receiving the interface data from the plurality of network devices at a second update frequency, wherein the second update frequency is lower than the first update frequency.

* * * * *